May 31, 1938. S. V. DAHLIN 2,119,224
DISPENSER FOR CHERRIES OR THE LIKE
Filed Aug. 4, 1937
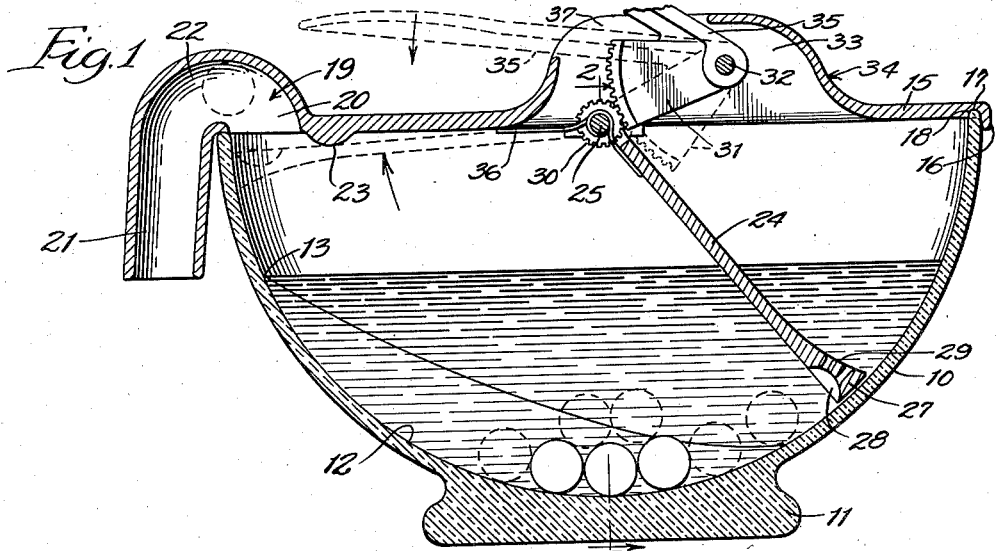
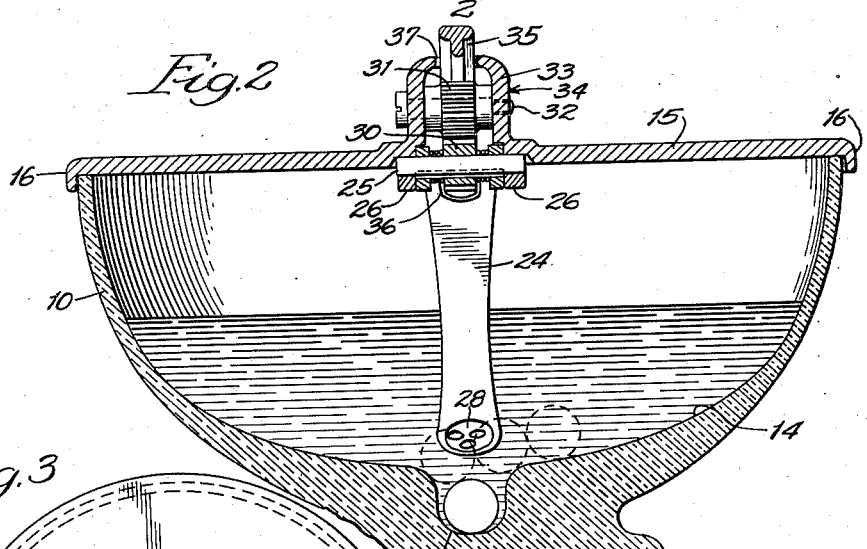
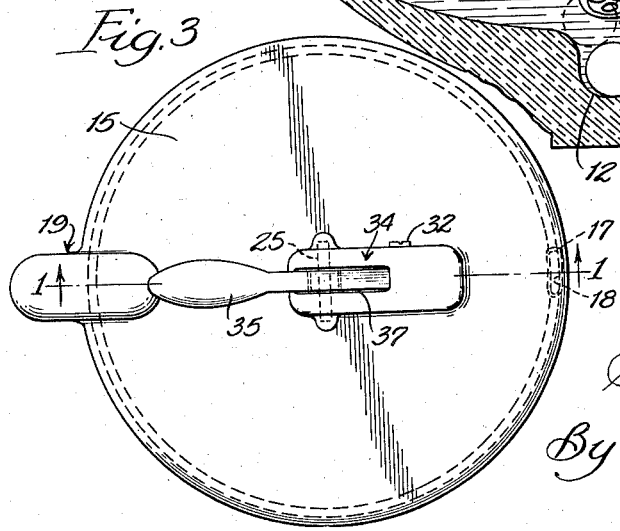
Inventor:
Stanley V. Dahlin,
By Banning & Banning
Attorneys.

Patented May 31, 1938

2,119,224

UNITED STATES PATENT OFFICE 2,119,224

DISPENSER FOR CHERRIES OR THE LIKE

Stanley V. Dahlin, Chicago, Ill.

Application August 4, 1937, Serial No. 157,372

1 Claim. (Cl. 312—89)

The dispenser of the present invention is designed primarily for the purpose of dispensing cherries singly as required in the preparation of cocktails or similar drinks, although the device is equally adapted for use in the dispensing of other small fruits or the like.

The cherries commonly used with cocktails or similar drinks are preserved in a liquid or syrup, but being heavier than the liquid they fall to the bottom thereof, which characteristic is availed of in the designing of the present invention.

In the dispensing of cherries singly it is, of course, desirable to avoid any splashing or spattering of the liquid, and to discharge the cherries as required directly into the glass containing the cocktail or similar drink into which it is desired to discharge one or more of the cherries.

Further objects and details of the invention will appear from the description thereof in conjunction with the accompanying drawing, wherein,—

Figure 1 is a sectional elevation of the device taken on a center plane through the spout and operating parts;

Fig. 2 is a similar sectional elevation taken at right angles to that of Figure 1 and on line 2—2 of said figure; and Fig. 3 is a top or plan view of the device.

The dispenser comprises a bowl 10 of hemispherical configuration, having formed on its exterior a flattened base or standard 11. The interior of the bowl is provided in its bottom with a channel 12, the floor of which is curved on the arc of a true circle, while the upper margins of the side walls run substantially in an oblique line, forming a chord of the circular curvature of the channel floor. This affords a channel which is deepest at its middle point and progressively shallower toward the ends, and the channel, at its upper end, terminates at a point 13, which is substantially at the intended level of the liquid. The bottom surface 14 of the bowl is curved in such a way as to merge smoothly and evenly into the channel 12, which channel is of slightly greater width than the diameter of an average cherry, so that when the liquid containing the cherries is poured into the bowl a number of cherries will settle to the bottom of the channel, as indicated in the drawing.

The bowl cooperates with a circular cover plate 15 which is provided around its margin with a flange 16 which fits snugly around the rim of the bowl, which bowl at a suitable point is provided with a boss or lug 17 which is adapted to enter a recess 18 in the under side of the cover for the purpose of properly centering the cover with respect to the bowl in order that the operating parts carried by the cover may properly coact with the channel 12 from which the cherries are delivered.

The cover plate 15, on the side immediately adjacent and above the upper or discharge end of the channel, is provided with a spout 19 of inverted J formation, having a short inner leg 20 and a longer outer leg 21 with the overhanging curved connecting wall 22. As shown, the spout is formed integrally with the cover plate, although it might, if desired, be formed integrally with the wall of the bowl. Adjacent the inner terminus of the short leg 20 of the spout is located a boss 23 constituting a stop or abutment for limiting the swing of an ejector arm 24, which when stopped will occupy the position indicated in dotted lines in Figure 1.

The ejector arm, as shown, is fixedly mounted upon a shaft 25 the ends of which are journalled within hangers 26 depending from the cover plate near the center thereof, the axis of the shaft being coincident with the center of curvature of the base of the channel and slightly above the surface of the boss 23, so that, as the ejector arm swings upon the shaft 25, its lower end 27 will travel through the channel in relatively close relation to the walls and base thereof, without, however, coming in contact therewith and will be arrested before it reaches the horizontal plane of its axis.

The lower end 27 of the shaft is dished on its front surface 28 to afford a semi-spherical cavity having a radius of curvature suitable to seat against a single cherry and carry the same forwardly as the lower end of the ejector arm sweeps through the channel 12. The base of the cavity is apertured to permit the liquid to drain away from the cherry, and it will be understood that the formation of this portion of the device may be changed or modified so long as provision is made for the engagement of a single cherry or the like, which will be separated from the procession lying within the channel and carried up by the arm to the point of discharge.

The relationship of the ejector arm 24 to the spout is such that the upward swing of the arm will be suddenly arrested by contact with the stop 33 and while it still possesses a forward component of movement, which will have the effect of hurling or ejecting the cherry upwardly and forwardly against the curving surface of the spout, which will cause the cherry to travel forwardly and downwardly and be discharged through the lower leg of the spout.

The rear surface 29 of the lower end of the ejector arm is preferably curved, as shown, or otherwise configured to present a smooth rounded surface so that there will be no tendency for the cherries to become wedged or lodged alongside the working parts, but on the contrary, as the ejector arm is retracted, it will simply have the effect of causing the cherries which are settled in the bottom of the channel to be carried out therefrom, with the result, however, that additional cherries will immediately settle down from the liquid, so that the supply of cherries will always be maintained in the channel in position to be engaged by the lower end of the ejector arm, which, however, will seat but a single cherry, so that others which may be driven out of the channel in advance by the upward swing of the arm will fall back into the liquid. Thus a single cherry will be carried upward and delivered by the impingement of the ejector arm against the stop 23.

As shown, the shaft 25 is located slightly above the acting face of the stop 23, and is rocked by means of a pinion 30 keyed upon the shaft, which meshes with a segmental rack 31 carried by a fixed pintle 32 extending transversely between the side walls 33 of a housing 34 which projects upwardly from the cover plate to afford a mounting for the working parts.

The segmental rack is formed integrally with an operating handle 35, which when depressed will oscillate the rack, which will transmit an upward swinging movement to the ejector arm 24 against the tension of a spring 36, which as shown encircles the shaft 25 and has its free ends in engagement respectively with the under wall of the cover and with the ejector arm 24. The handle 35 operates within a slot 37 in the housing 34, but it will be understood that the particular means here shown for actuating the ejector arm serve primarily for purposes of illustration, since other means for imparting the necessary swinging movements may be substituted in lieu thereof.

The operation of the device will be apparent from the preceding description, but it will be understood that the configuration and location of the spout in relation to the arc of movement of the ejector arm should in all cases be properly computed, so that the arm will be arrested, and the cherry ejected in such a manner as to cause it to travel forwardly in sufficient degree to enter the upper end of the outer leg 21 of the spout, so as to be discharged therefrom. This requires that sufficient velocity be imparted to the ejector arm to afford the propulsion necessary to cause the arm, when suddenly arrested, to hurl the cherry upwardly and outwardly with sufficient force to prevent it from falling back into the interior of the bowl.

It is desirable, therefore, that the stop 23 shall project slightly below the level of the axis of movement of the arm, so that the cherry, when ejected, will have a forward component of movement sufficient to cause it to travel over the abutment afforded by the upper terminus of the inner wall of the spout and downwardly into the discharge leg.

The provision of the lug 17 within the recess 18 will properly center the cover which fits snugly upon the upper circular rim of the bowl, so that the coacting relationship between the ejector arm and the channel 12 will be maintained.

By forming the cover plate in the manner described, it will afford the necessary mounting for all of the operating parts and it may be applied or removed as a unit, thereby permitting easy access to the interior, at the same time facilitating the cleaning of the bowl and the operating parts as occasion may require.

The device is one which permits the cherries to be easily discharged singly into a glass or tumbler without permitting any of the liquid to escape from the bowl, so that there is no danger of slopping or spilling the liquid, or causing the surrounding area to be spattered and befouled by drippings from the bowl or from the cherries.

Although the device has been described with particularity as to detail, it is not the intention to limit the construction to the particular form shown, since modifications may be made therein without departing from the spirit of the invention.

I claim:

In an ejector of the class described, the combination of a bowl provided in its bottom with a channel having its base wall formed on a true arc of curvature, said channel being adapted to confine in processional relation a plurality of the articles to be dispensed, a cover fitted upon the bowl and provided on one side with a discharge spout of inverted J-shape formation, having its short leg communicating with the interior of the bowl and its long leg discharging exteriorly of the bowl, the mouth of the short leg being above the terminus of the channel, an ejector arm pivoted to the cover on the axis of curvature of the base of the channel and in position to have its free end sweep through the channel, the free end being dished to engage and carry upwardly from the channel a single article to be dispensed, a stop on the cover for suddenly arresting the movement of the ejector arm in position to cause the article carried thereby to be ejected into the spout and to be there directed outwardly through the discharge end of the spout, and means carried by the cover for oscillating the ejector arm.

STANLEY V. DAHLIN.